United States Patent
Osawa et al.

(10) Patent No.: US 7,550,211 B2
(45) Date of Patent: Jun. 23, 2009

(54) MAGNETIC RECORDING MEDIUM AND MAGNETIC RECORDING AND REPRODUCING DEVICE

(75) Inventors: Hiroshi Osawa, Ichihara (JP); Shun Matsumoto, Ichihara (JP); Daizo Endo, Jurong (SG)

(73) Assignee: Showa Denko K.K., Tokyo (JP)

( * ) Notice: Subject to any disclaimer, the term of this patent is extended or adjusted under 35 U.S.C. 154(b) by 82 days.

(21) Appl. No.: 10/582,109

(22) PCT Filed: Aug. 9, 2005

(86) PCT No.: PCT/JP2005/014876

§ 371 (c)(1),
(2), (4) Date: Jul. 28, 2006

(87) PCT Pub. No.: WO2006/019063

PCT Pub. Date: Feb. 23, 2006

(65) Prior Publication Data

US 2007/0122659 A1    May 31, 2007

Related U.S. Application Data

(60) Provisional application No. 60/604,489, filed on Aug. 26, 2004.

(30) Foreign Application Priority Data

Aug. 16, 2004    (JP) .............................. 2004-236454

(51) Int. Cl.
G11B 5/66    (2006.01)

(52) U.S. Cl. .................... 428/831; 428/826; 428/831.2; 428/832.2

(58) Field of Classification Search ................. 428/831, 428/832.2
See application file for complete search history.

(56) References Cited

U.S. PATENT DOCUMENTS 5,993,956 A    11/1999    Lambeth et al.

(Continued)

FOREIGN PATENT DOCUMENTS

JP    4-205916 A    7/1992

(Continued)

OTHER PUBLICATIONS

Y. Shiroishi, et al., "Recent Progress in Rigid Disk Media for Longitudinal High-Density Magnetic Recording", Central Research Lab., Hitachi Ltd., Journal of Japan Applied Magnetism Society, vol. 17, No. 5, 1993, pp. 784-791.

(Continued)

*Primary Examiner*—Holly Rickman
*Assistant Examiner*—Gary D Harris
(74) *Attorney, Agent, or Firm*—Sughrue Mion, PLLC

(57) ABSTRACT

A magnetic recording medium includes an orientation adjusting layer, a nonmagnetic under layer, a nonmagnetic intermediate layer, a magnetic layer and a protective layer sequentially stacked on a nonmagnetic substrate provided on a first surface thereof with a texture streak and used for a magnetic disc. The nonmagnetic under layer contains at least a layer formed of a Cr—Mn-based alloy and possesses magnetic anisotropy having an axis of easy magnetization in a circumferential direction thereof. A magnetic recording and reproducing device includes the magnetic recording medium and a magnetic head for enabling information to be recorded in and reproduced from the magnetic recording medium.

15 Claims, 1 Drawing Sheet

U.S. PATENT DOCUMENTS

| | | | |
|---|---|---|---|
| 6,541,125 B2 * | 4/2003 | Futamoto et al. | 428/611 |
| 6,677,051 B1 | 1/2004 | Acharya et al. | |
| 6,821,653 B2 * | 11/2004 | Fukushima et al. | 428/831.2 |
| 6,878,459 B2 * | 4/2005 | Takahashi et al. | 428/832.2 |
| 7,141,272 B2 * | 11/2006 | Murao et al. | 427/131 |
| 2001/0031383 A1 | 10/2001 | Sakawaki et al. | |
| 2002/0150796 A1 * | 10/2002 | Kanbe et al. | 428/694 TS |
| 2004/0037005 A1 | 2/2004 | Osawa | |
| 2005/0170103 A1 * | 8/2005 | Murao et al. | 427/548 |
| 2005/0191524 A1 * | 9/2005 | Murao et al. | 428/827 |

FOREIGN PATENT DOCUMENTS

| | | |
|---|---|---|
| JP | 3117438 B1 | 10/2000 |
| JP | 2001-176047 A | 6/2001 |
| JP | 2001-209927 A | 8/2001 |
| JP | 2001-331934 A | 11/2001 |
| JP | 2002-163817 A | 6/2002 |
| JP | 2004-86936 A | 3/2004 |
| WO | WO 03/083840 A1 | 10/2003 |

OTHER PUBLICATIONS

J. Zhu, et al., "Computer Modeling of the Write Process in Perpendicular Recording", IEEE Transactions on Magnetics, vol. Mag-22, No. 5, Sep. 1986, pp. 379-381.

* cited by examiner

F I G. 1
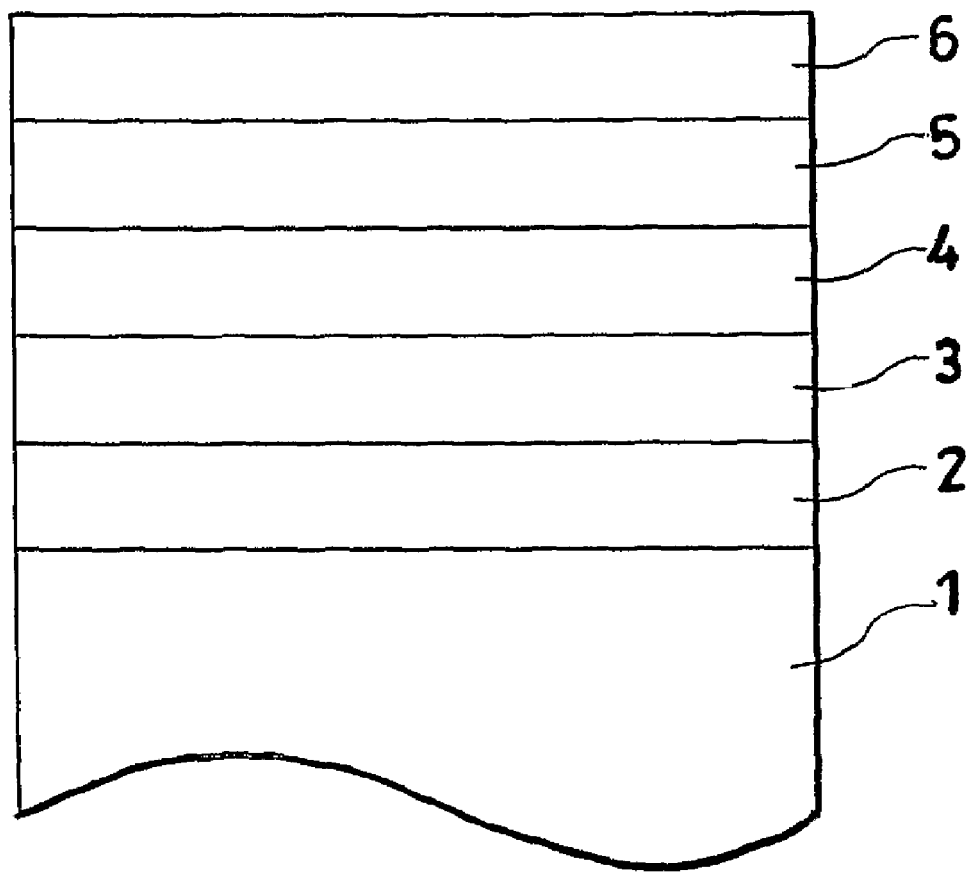

MAGNETIC RECORDING MEDIUM AND MAGNETIC RECORDING AND REPRODUCING DEVICE

CROSS REFERENCE TO RELATED APPLICATIONS

This application is an application filed under 35 U.S.C. §111(a) claiming the benefit pursuant to 35 U.S.C. §119(e)(1) of the filing dates of Provisional Application No. 60/604,489 filed Aug. 26, 2004 and Japanese Application No. 2004-236454 filed Aug. 16, 2004 pursuant to 35 U.S.C §111(b).

TECHNICAL FIELD

This invention relates to a magnetic recording medium having an orientation adjusting layer, a nonmagnetic under layer, a nonmagnetic intermediate layer, a magnetic layer and a protective layer sequentially stacked on a magnetic substrate provided on the first surface thereof with a texture streak and used for a magnetic disc and to a magnetic recording and reproducing device for recording and reproducing a magnetic signal in the magnetic recording medium.

BACKGROUND ART

The hard disc drive (HDD) which is one kind of a magnetic recording and reproducing device at present has the recording density thereof increase at an annual rate of 60%. It is said that this inclination will continue in the future. In consequence of this inclination, the development of a magnetic recording head and the development of a magnetic recording medium suitable for the high recording density have been being promoted.

The magnetic recording medium which is used in the hard disc drive has been required to follow this inclination toward higher recording density and consequently enhance the coercive force and enhance the signal/noise ratio (SNR) as well.

Concerning the magnetic recording medium to be used in the hard disc drive, the structure having metal films deposited by the sputtering technique on a substrate adapted for a magnetic recording medium is now prevailing. As the substrates suitable for the magnetic recording medium, the aluminum substrate and the glass substrate are being widely used. The aluminum substrate is what is obtained by forming a Ni—P-based alloy layer in a thickness of about 10 μm by electroless plating on a substrate of an Al—Mg alloy ground to specular finish and further grinding the surface of this layer to specular finish. The glass substrate is known in different kinds, such as an amorphous glass and a crystallized glass. The glass substrates of both kinds are ground to specular finish prior to use.

The magnetic recording media which are generally used at present for hard disc drives are in a structure having a nonmagnetic under layer (made of Cr, a Cr-based alloy, a Ni—Al-based alloy, for example), a nonmagnetic intermediate layer (made of a Co—Cr— or Co—Cr—Ta-based alloy, for example), a magnetic layer (made of a Co—Cr—Pt—Ta— or Co—Cr—Pt—B-based alloy, for example), and a protective film (made of carbon, for example) sequentially stacked on a nonmagnetic substrate and having a lubricating film made of a liquid lubricant formed thereon.

Several methods are available for the purpose of enhancing the coercive force of a magnetic recording medium. In the case of the magnetic recording medium of an alloy base having Co as a main component for the magnetic layer, for example, the method resorting to the addition of Pt proves effective. Numerous reports have been already published concerning this method. Also, the use of a CrMn-based alloy as a nonmagnetic under layer has been proposed (refer to U.S. Pat. No. 5,993,956).

As regards the magnetostatic property of the magnetic recording medium, the method of imparting the magnetic anisotropy having an axis of easy magnetization in the circumferential direction and heightening this property is effective as well as the method of enhancing the coercive force in enhancing recording properties and homogenizing the characteristic properties of the medium. At present, therefore, it is generally known that the magnetic recording medium using a substrate resulting from plating an aluminum alloy with a Ni—P-based alloy layer (otherwise called an aluminum substrate) is enabled, by undergoing the texture processing for mechanically inscribing a fine groove in the circumferential direction on the Ni—P-based alloy surface, to manifest the magnetic anisotropy having an axis of easy magnetization in the circumferential direction (refer to IEEE Trans on Mag. Vol. Mag-22, No. 5 (1986), 379 and Journal of Japan Applied Magnetism Society, Vol. 17, No. 5 (1993) 784).

As a nonmagnetic substrate, the glass substrate, for example, possesses rigidity excelling in impact resistance and possesses excellent flatness as well and, therefore, may well be rated as a nonmagnetic substrate appropriate for high recording density. When the magnetic anisotropy in the circumferential direction can be imparted to the magnetic recording medium using glass for the nonmagnetic substrate, it can be expected to acquire outstanding recording and reproducing properties.

Several methods which form texture streaks on a glass substrate by subjecting this substrate to the texture processing have been known. For the purpose of forming fine and uniform texture streaks, the idea of using a woven fabric tape comprising an abrasive grain suspension containing a solution possessing a hydroxyl group and plastic fibers has been proposed (refer to Japanese Patent No. 3117438).

Further, for the purpose of forming fine and uniform texture streaks, the idea of using diamond abrasive grains and $CeO_2$ abrasive grains together has been proposed.

It is, however, difficult to impart a fully satisfactory magnetic anisotropy in the circumferential direction to the glass substrate by merely forming the texture streaks therein. Thus, for the purpose of imparting the magnetic anisotropy in the circumferential direction to the glass substrate having a linear texture formed on the first surface thereof, the idea of forming a pre-coated layer by the sputtering technique (refer to JP-A HEI 4-205916), the idea of forming an amorphous layer containing at least Ni and P (refer to JP-A 2001-209927), and the idea of forming an orientation adjusting layer of a Co—W-based alloy or a Co—Mo-based alloy (refer to JP-A 2004-86936) have been proposed.

As described above, several methods for imparting the magnetic anisotropy to a glass substrate having texture streaks formed thereon have been already proposed. Generally, however, the degree of anisotropy is small as compared with the case of using an aluminum substrate. Not only when the glass substrate is used but also when the aluminum substrate is used, the anisotropy is required to be further enhanced.

This invention has been proposed in view of the state of affairs mentioned above and has for an object thereof the provision of a magnetic recording medium and a magnetic recording and reproducing device which abound in magnetic anisotropy suitable for high density recording and excel in recording properties.

DISCLOSURE OF THE INVENTION

For the purpose of accomplishing the object mentioned above, the first aspect of the invention provides a magnetic recording medium comprising an orientation adjusting layer, a nonmagnetic under layer, a nonmagnetic intermediate layer, a magnetic layer and a protective layer sequentially stacked on a nonmagnetic substrate provided on a first surface thereof with a texture streak and used for a magnetic disc, wherein the nonmagnetic under layer contains at least a layer formed of a Cr—Mn-based alloy and possesses magnetic anisotropy having an axis of easy magnetization in a circumferential direction thereof.

In the second aspect that includes the first aspect of the invention, the magnetic anisotropy in an amount of residual magnetization has an index of 1.3 or more that is an amount of residual magnetization in a circumferential direction divided by an amount of residual magnetization in a radial direction.

In the third aspect that includes the first or second aspect of the invention, the layer of Cr—Mn-based alloy that forms at least part of the nonmagnetic under layer has an Mn content in a range of 1 to 60 at %.

In the fourth aspect that includes the first or second aspect of the invention, the layer of Cr—Mn-based alloy that forms at least part of the nonmagnetic under layer has an Mn content in a range of 5 to 40 at %.

In the fifth aspect that includes any one of the first to fourth aspects of the invention, the nonmagnetic under layer at least possesses a stacked structure consisting of a Cr—Mn-based alloy layer and a Cr—Mo-based alloy layer formed thereon.

In the sixth aspect that includes any one of the first to fourth aspects of the invention, the nonmagnetic under layer at least possesses a stacked structure consisting of a Cr—Mn-based alloy layer and a Cr—Ti-based alloy layer formed thereon.

In the seventh aspect that includes any one of the first to sixth aspects of the invention, the nonmagnetic substrate is formed of amorphous glass or crystallized glass.

In the eighth aspect that includes any one of the first to sixth aspects of the invention, the nonmagnetic substrate is formed of a single crystal Si or a polycrystal Si.

In the ninth aspect that includes any one of the first to eighth aspects of the invention, the texture streak on the nonmagnetic substrate for the magnetic disc has a line density of 7500 lines/mm or more.

In the tenth aspect that includes any one of the first to ninth aspects of the invention, the orientation adjusting layer is formed of at least one layer of alloy selected from the group consisting of Co—W-based alloy, Co—Mo-based alloy, Co—Ta-based alloy, Co—Nb-based alloy, Ni—Ta-based alloy, Ni—Nb-based alloy, Fe—W-based alloy, Fe—Mo-based alloy and Fe—Nb-based alloy.

In the eleventh aspect that includes any one of the first to tenth aspects of the invention, the nonmagnetic intermediate layer is formed of at least one layer of alloy selected from the group consisting of Co—Cr-based alloy, Co—Cr—Ta-based alloy, Co—Cr—Ru-based alloy, Co—Cr—Zr-based alloy and Co—Cr—Pt-based alloy.

In the twelfth aspect that includes any one of the first to eleventh aspects of the invention, the nonmagnetic intermediate layer possesses a stacked structure consisting of a layer of at least one alloy selected from the group consisting of Co—Cr-based alloy, Co—Cr—Ta-based alloy, Co—Cr—Ru-based alloy, Co—Cr—Zr-based alloy and Co—Cr—Pt-based alloy and a layer of Ru or Ru alloy formed thereon.

In the thirteenth aspect that include any one of the first to twelfth aspects of the invention, the magnetic layer contains one or more alloys selected from the group consisting of Co—Cr—Pt-based alloy, Co—Cr—Pt—Ta-based alloy, Co—Cr—Pt—B-based alloy, Co—Cr—Pt—B—Ta-based alloy and Co—Cr—Pt—B—Cu-based alloy.

In the fourteenth aspect that includes any one of the first to thirteenth aspects of the invention, the first surface of the orientation adjusting layer has undergone a treatment for exposure to an ambient gas containing $5 \times 10^{-4}$ Pa or more of oxygen gas.

The fifteenth aspect of the invention provides a magnetic recording and reproducing device, comprising the magnetic recording medium of any one of the first to fourteenth aspects of the invention and a magnetic head for enabling information to be recorded in and reproduced from the magnetic recording medium.

The magnetic recording medium of this invention comprises an orientation adjusting layer, a nonmagnetic under layer, a nonmagnetic intermediate layer, a magnetic layer and a protective layer sequentially stacked on a nonmagnetic substrate provided on the first surface thereof with a texture streak and used for a magnetic disc, wherein the nonmagnetic under layer is formed in a structure at least containing a layer formed of a Cr—Mn-based alloy. This specific configuration results in inducing manifestation of strong magnetic anisotropy having the circumferential direction as an axis of easy magnetization and enhancing the characteristic properties of the magnetic recording medium. As a result, it is made possible to obtain a magnetic recording medium and a magnetic recording and reproducing device which befit high recording density, abound in magnetic anisotropy and excel in recording properties.

The above and other objects, characteristic features and advantages of the invention will become apparent to those skilled in the art from the description given herein below with reference to the accompanying drawing.

BRIEF DESCRIPTION OF THE DRAWING

FIG. 1 is a schematic diagram illustrating one preferred embodiment of the magnetic recording medium of this invention.

BEST MODE FOR CARRYING OUT THE INVENTION

The magnetic recording medium of this invention is configured by having an orientation adjusting layer, a nonmagnetic under layer, a nonmagnetic intermediate layer, a magnetic layer and a protective layer sequentially stacked on a nonmagnetic substrate provided on the first surface thereof with a texture streak and used for a magnetic disc and is characterized by providing the nonmagnetic under layer with a structure which at least contains a layer formed of a Cr—Mn-based alloy and possessing magnetic anisotropy having the circumferential direction as an axis of easy magnetization.

FIG. 1 is a schematic diagram illustrating one embodiment of the magnetic recording medium of this invention, in which reference numeral 1 denotes a nonmagnetic substrate, 2 an orientation adjusting layer, 3 a nonmagnetic under layer, 4 a nonmagnetic intermediate layer, 5 a magnetic layer and 6 a protective layer. The individual layers 1 to 6 do not need to be restricted to a single-layer constitution but may be optionally in a stacked structure formed of a plurality of layers.

As the nonmagnetic substrate 1, substrates formed of nonmagnetic metals obtained by plating aluminum alloys with a Ni—P-based alloy layer, such as the aforementioned aluminum substrate, and substrates formed of nonmagnetic nonmetallic materials, such as amorphous glass or crystallized glass, or single crystal Si or polycrystal Si are available. In the case of amorphous glass, general-purpose soda-lime glass, aluminoborosilicate glass and aluminosilicate glass are available. Then, as the crystallized glass, lithium-based crystallized glass may be used. Among other glasses enumerated above, the use of amorphous glass which possesses uniform solid state properties, such as hardness, is at an advantage in subjecting a given first surface to homogeneous texture processing.

The first surface of the nonmagnetic substrate 1 allows a texture streak to be formed thereon with a wrapping tape using fixed abrasive grains or by texture processing using free abrasive grains, for example. The streak formed on the first surface preferably lies along the circumferential direction of the substrate. The average surface roughness Ra of the substrate having the streak formed on the first surface thereof is in the range of 0.05 to 1 nm and preferably in the range of 0.1 to 0.5 nm.

If the average surface roughness Ra falls short of 0.05 nm, the shortage will result in rendering the substrate excessively flat and diminishing the effect of heightening the magnetic anisotorpy of the magnetic layer 5. Conversely, if the average surface roughness Ra exceeds 1 nm, the overage will result in degrading the flatness of the medium surface and rendering it difficult to lower the flying height of the magnetic head during the course of the recording and reproducing.

The line density of the texture streak is preferably 7500 lines/mm or more. The line density is determined in the radial direction of the nonmagnetic substrate 1. The line density is specified to be 7500 lines/mm or more because the effect of the streak is reflected by the magnetic properties (such as the effect of enhancing the coercive force, for example,) and the recording and reproducing properties (such as the effect of enhancing the SNR). The effect mentioned above further gains in prominence when the line density is increased to 20000 lines/mm or more.

The streak is preferably formed, for example, with a wrapping tape using fixed abrasive grains or by mechanical texture processing using free abrasive grains.

The orientation adjusting layer 2 is intended to set right the crystal orientation of the nonmagnetic under layer 3 formed on the first surface thereof, adjust the crystal orientations of the nonmagnetic intermediary layer 4 and the magnetic layer 5 formed further thereon and enhance the magnetic anisotropy in the circumferential direction of the magnetic layer 5. The orientation adjusting layer 2 not only adjusts the crystal orientation but also fulfils the function of finely refining the crystal grains in the nonmagnetic under layer 3, the nonmagnetic intermediate layer 4 and the magnetic layer 5.

Though the material to be used for the orientation adjusting layer 2 does not need to be particularly restricted, this layer preferably uses at least one alloy selected from the group consisting of Co—W-based alloy, Co—Mo-based alloy, Co—Ta-based alloy, Co—Nb-based alloy, Ni—Ta-based alloy, Ni—Nb-based alloy, Fe—W-based alloy, Fe—Mo-based alloy and Fe—Nb-based alloy. The use of an alloy containing a $Fe_7W_6$ structure is thought to enhance the magnetic anisotropy in the circumferential direction of the magnetic film.

The orientation adjusting layer 2 may incorporate therein an element which possesses an auxiliary effect. As concrete examples of the element which is available for the incorporation, Ti, V, Cr, Mn, Zr, Hf, Ru, B, Al, Si and P may be cited. The total content of the added element is preferably 20 at % or less. If the total content exceeds 20 at %, the overage will result in degrading the aforementioned effect of the orientation adjusting layer. The lower limit of the total content is 0.1 at %. If the total content falls short of 0.1 at %, the shortage will result in nullifying the effect of the added element.

The orientation adjusting layer 2 preferably has a thickness in the range of 1 to 30 nm. If the thickness of the orientation adjusting layer falls short of 1 nm, the shortage will result in preventing the nonmagnetic under layer 3 from acquiring sufficient crystal orientation and degrading the coercive force thereof. If the thickness of the orientation adjusting layer exceeds 30 nm, the overage will result in degrading the magnetic anisotropy in the circumferential direction of the magnetic film. For the purpose of enhancing the magnetic anisotropy in the circumferential direction of the magnetic film, the thickness of the orientation adjusting film is more preferably in the range of 2 to 10 nm.

It is favorable to form between the orientation adjusting layer 2 and the nonmagnetic substrate 1 a layer having Ti, Cr, etc. as main components for the purpose of enhancing the adhesive property. Though the material for the layer so interposed does not need to be particularly restricted, Ti, Cr, Cr—Ti-based alloy, Cr—Mo-based alloy and Cr—Ta-based alloy are available. The content of the second element in such an alloy system is preferably in the range of 10 to 60 at %.

It is favorable to oxidize the first surface of the orientation adjusting layer 2 by exposing this layer to an atmosphere of oxygen after it has been formed. The atmosphere of oxygen to be used for this exposure is preferably an atmosphere containing $5 \times 10^{-4}$ Pa or more of oxygen gas. The atmospheric gas intended for this exposure may be used as it is held in contact with water. The duration of this exposure is preferably in the range of 0.5 to 15 seconds. For example, the orientation adjusting film is preferably withdrawn from the chamber and exposed to the ambient atmosphere or to the atmosphere of oxygen as soon as it is formed. Otherwise, the method which consists in keeping the freshly formed film unremoved from the chamber, introducing an ambient air or oxygen into the chamber and exposing the film thereto may be favorably adopted. The method which performs the exposure in the chamber proves particularly advantageous because it obviates the necessity for a complicated step of removing the film from the vacuum chamber and enables the formation of this film to be implemented within a continuous series of film formation including the formation of the nonmagnetic under layer 3 and the magnetic layer 5. In this case, the atmosphere preferably contains $5 \times 10^{-4}$ Pa or more of oxygen gas at an ultimate degree of vacuum of $1 \times 10^{-6}$ Pa or less. Incidentally, the upper limit of the oxygen gas pressure during the exposure to oxygen is preferably $5 \times 10^{-2}$ Pa or less though the exposure may be performed under the atmospheric pressure.

The nonmagnetic under layer 3 is in a structure containing at least a Cr—Mn-based alloy layer. The Mn content in the Cr—Mn-based alloy is preferably in the range of 1 to 60 at % acquiring a body-centered cubic structure (BCC structure) and more preferably in the range of 5 to 40 at %. If the content falls short of 1 at %, the shortage will result in bringing no conspicuous effect of enhancing the magnetic anisotropy. Conversely, if the content exceeds 60 at %, the overage will result in lowering the ratio of the BCC structure and degrading the coercive force as well. For the purpose of adding to the lattice constant of the Cr—Mn-based alloy layer, the measure to incorporate Mo, W, V, Ti, etc. so as to enlarge the lattice constant of the Cr—Mn-based alloy and enable the lattice constant of this alloy to match the lattice constant of the Co alloy in the nonmagnetic intermediate layer 4 and the magnetic layer 5 proves advantageous. The addition of B proves favorable from the viewpoint of effectuating refinement of crystals and enhancing the SNR property of the magnetic recording medium.

The crystal orientation of the Cr—Mn-based alloy layer of the nonmagnetic under layer 3 preferably has the (100) face as a preferential face of orientation. As a result, this choice brings the effect of enhancing the magnetic properties, such as the coercive force, for example, and enhancing the recording and reproducing properties, such as the SNR, for example, because the crystal orientation of the Co alloy of the magnetic layer 5 formed on the nonmagnetic under layer 3 is made to indicate (11.0) more strongly.

Incidentally, the sign "." in the indication of the crystal face represents the abbreviated form of the Miller Bravais index expressing the crystal face. Specifically, in expressing the crystal face, the hexagonal system, such as of Co, generally uses the four indexes of (hkil). Among other indexes, the index "i" is defined as i=−(h+k). In the abbreviated form, this part "i" is expressed as (hk.1).

The nonmagnetic under layer 3 is preferably adapted to acquire a stacked structure which at least comprises a Cr—Mn-based alloy layer and a Cr—Mo-based alloy layer formed thereon. A Cr—Ti-based alloy layer, a Cr—W-based alloy layer or a Cr—V-based alloy layer may take the place of the Cr—Mo-based alloy layer in the stacked structure.

It is preferable to form at least one layer selected from the group consisting of the Cr—Mo-based alloy layer, the Cr—Ti-based alloy layer, the Cr—W-based alloy layer and the Cr—V-based alloy layer between the nonmagnetic under layer 3 and the nonmagnetic intermediate layer 4 for the purpose of enhancing the state of matching of the lattice constant of the nonmagnetic intermediate layer 4 and that of the magnetic layer 5. As a result, this improved matching brings the effect of enhancing the magnetic properties, such as the coercive force, for example, and enhancing the recording and reproducing properties, such as the SNR, for example, because the crystal orientation of the Co alloy of the nonmagnetic intermediate layer 4 and the magnetic layer 5 formed on the nonmagnetic under layer 3 is made to indicate (11.0) more strongly.

Though the material to be used for the nonmagnetic intermediate layer 4 does not need to be particularly restricted, it is preferably a Co alloy which has Co as a main component and assumes a hexagonal close-packed structure (HCP structure). The material preferably contains one member selected from the group consisting of Co—Cr-based alloy, Co—Cr—Ta-based alloy, Co—Cr—Ru-based alloy, Co—Cr—Zr-based alloy and Co—Cr—Pt-based alloy, for example. When the Co—Cr-based alloy is selected, the Cr content is preferably in the range of 25 to 45 at % from the viewpoint of enhancing the SNR. The addition of B proves favorable from the viewpoint of effectuating refinement of crystals and enhancing the SNR property of the magnetic recording medium. The thickness of the nonmagnetic intermediate layer 4 is preferably in the range of 0.5 to 3 nm from the viewpoint of enhancing the SNR.

It is further favorable to form a nonmagnetic alloy layer consisting of Ru or having Ru as a main component on the nonmagnetic Co alloy layer. This stacking results in enhancing the coercive force.

The magnetic layer 5 is preferably made of a material which constitutes a Co alloy having as a main component thereof Co possessing a lattice fully satisfactorily matching with the (100) face, for example, of the nonmagnetic intermediate layer 4 lying directly below and assumes an HCP structure. It preferably contains any one member selected from the group consisting of Co—Cr—Ta-based, Co—Cr—Pt-based, Co—Cr—Pt—Ta-based, Co—Cr—Pt—B—Ta-based and Co—Cr—Pt—B—Cu-based alloys, for example.

In the case of the Co—Cr—Pt-based alloy, for example, the Cr content is preferably in the range of 8 to 28 at % and the Pt content in the range of 8 to 18 at % from the viewpoint of enhancing the SNR.

In the case of the Co—Cr—Pt—B-based alloy, for example, the Cr content is preferably in the range of 8 to 28 at %, the Pt content in the range of 8 to 18 at % and the B content in the range of 1 to 20 at % from the viewpoint of enhancing the SNR.

In the case of the Co—Cr—Pt—B—Ta-based alloy, for example, the Cr content is preferably in the range of 8 to 25 at %, the Pt content in the range of 8 to 18 at %, the B content in the range of 1 to 20 at % and the Ta content in the range of 1 to 4 at % from the viewpoint of enhancing the SNR.

In the case of the Co—Cr—Pt—B—Cu-based alloy, for example, the Cr content is preferably in the range of 8 to 28 at %, the Pt content in the range of 8 to 18 at %, the B content in the range of 1 to 20 at % and the Cu content in the range of 1 to 8 at % from the viewpoint of enhancing the SNR.

The thickness of the magnetic layer 5 poses no problem from the viewpoint of thermal fluctuation so long as it is 10 nm or more. It is preferably 30 nm or less, however, in view of the request for high recording density. If this thickness exceeds 30 nm, the overage will result in enlarging the crystal particle diameter of the magnetic layer 5 and preventing this layer from acquiring satisfactory recording and reproducing properties. The magnetic layer 5 may be formed in a multi-layer structure and the material therefor may be a suitable combination of members selected from the group mentioned above.

The protective layer 6 may be made of any of the known materials, such as the simple substances of carbon, SiC and SiN, for example, and the materials having such simple substances as main components thereof. The thickness of the protective layer is preferably in the range of 1 to 10 nm from the viewpoint of decreasing the magnetic spacing when the magnetic recording medium is used in the state of high recording density and ensuring durability. The magnetic spacing refers to the distance between the read-write device of the magnetic head and the magnetic layer 5. The electromagnetic conversion property is enhanced in accordance as the magnetic spacing is narrowed. Incidentally, the protective layer constitutes a factor for widening the magnetic spacing because it intervenes between the read-write device of the magnetic head and the magnetic layer 5.

The protective layer 6 may be optionally overlaid by a lubricating layer which is formed of a fluorine-based lubricating agent, such as perfluoropolyether, for example.

The magnetic layer 5 of the magnetic recording medium of this invention, when the index of the magnetic anisotropy of the residual amount of magnetization (amount of residual magnetization in the circumferential direction/amount of residual magnetization in the radial direction) is 1.3 or more and preferably 1.5 or more, is enabled to acquire the effect of enhancing the magnetic properties, such as the coercive force, for example, and the effect of enhancing the recording and reproducing properties, such as the SNR and the half power width (PW50) of an isolated inversion signal, for example. The index of the magnetic anisotropy can be measured using a sample vibration magnetometer (SVM).

Now, one example of the method of production contemplated by this invention will be described below.

As the nonmagnetic substrate 1, a substrate formed of a nonmagnetic metal resulting from plating an aluminum alloy with an Ni—P-based alloy layer or a substrate formed of a nonmagnetic nonmetallic material consisting of amorphous glass or a crystallized glass, or a single crystal Si or a polycrystalline Si is used. In the case of the amorphous glass, general-purpose soda lime glass, aluminoborosilicate glass and aluminosilicate glass are available. As the crystallized glass, lithium-based crystallized glass may be used. Among other glasses enumerated above, the amorphous glass which possesses uniform solid state properties including hardness is used particularly advantageously because it is capable of subjecting a given first surface to homogeneous texture processing.

The average surface roughness Ra of the nonmagnetic substrate 1 is 2 nm or less and preferably 1 nm or less.

The minute wave (Wa) of the first surface is preferably 0.3 nm or less (more preferably 0.25 nm or less). For the sake of the stability of the flight of the magnetic head, it is advantageous to use the substrate having an average surface roughness Ra of 10 nm or less (preferably 9.5 nm or less) in either or both of the chamfered part and the lateral part of the end face. The minute wave (Wa) can be determined as the average surface roughness within the measuring range of 80 μm by using a surface roughness tester P-12 (made by KLM-Tencor K.K.).

At the start, the first surface of the nonmagnetic substrate 1 is subjected to the texturing process so as to form a streak of a line density of 7500 lines/mm or more on the first surface. The first surface of a glass substrate, for example, is textured in the circumferential direction by a mechanical process using fixed abrasive grains and/or free abrasive grains (occasionally referred to as "mechanical texturing process") so as to form a texture streak having a line density of 7500 lines/mm or more on the front surface. The texturing process is implemented, for example, by pressing an abrasive tape against the first surface of the substrate till fast contact, feeding abrasive slurry containing abrasive grains to the interface between the substrate and the abrasive tape, and rotating the substrate and feeding the abrasive tape at the same time. The rotation of the substrate may be performed at a velocity in the range of 200 to 1000 rpm. The feed rate of the abrasive slurry may be in the range of 10 to 100 ml/min. The feed speed of the abrasive tape may be in the range of 1.5 to 150 mm/min. The particle diameter in D90 (magnitude of particle diameter found when the accumulated mass equals 90 mass %) of the abrasive grains contained in the abrasive slurry may be in the range of 0.05 to 0.3 μm. The pressing force exerted on the tape may be in the range of 1 to 15 kgf (9.8 to 147 N). These conditions are preferably so set as to ensure formation of a texture streak of a line density of 7500 lines/mm or more (more preferably 20000 lines/mm or more).

The average surface roughness Ra of the glass substrate 1 which has the texture stream formed on the first surface thereof is in the range of 0.05 to 1 nm (0.5 to 10 Å) and preferably in the range of 0.1 to 0.5 nm (1 to 5 Å).

The texturing process may be carried out in the presence of oscillation. The term "oscillation" as used herein refers to an operation of keeping the tape in motion in the circumferential direction of the substrate and at the same time shaking the tape in the radial direction of the substrate. The condition for this oscillation is preferably in the range of 60 to 1200 swings/min.

As a way of performing the texturing process, the method which consists in forming a texture streak having a line density of 7500 lines/mm or more can be used. Besides the method resorting to the mechanical texture mentioned above, the method which uses fixed abrasive grains, the method which uses a stationary grind stone, and the method which resorts to laser processing are available.

As a way of forming a film, the ordinary sputtering method may be used. The condition of this sputtering is fixed as follows, for example. The chamber to be used for the formation is evacuated till the degree of vacuum reaches a level in the range of $10^{-4}$ to $10^{-7}$ Pa. The nonmagnetic substrate 1 having a texture streak formed on the first surface thereof is fetched into the chamber and the Ar gas as a sputtering gas is introduced into the chamber and discharged therein to effect the formation of a film by sputtering. At this time, the power to be supplied is in the range of 0.05 to 2.0 kW. The film thickness to be expected can be obtained by adjusting the duration of the discharge and the power supplied.

The crystal orientation in the nonmagnetic under layer 3 and the magnetic layer 5 can be enhanced by heating the nonmagnetic substrate 1. The heating temperature of the nonmagnetic substrate 1 is preferably in the range of 100 to 400° C. Further, this heating is more preferably executed after the orientation adjusting film has been formed.

On the nonmagnetic substrate 1, the orientation adjusting layer 2 is formed by the sputtering technique using a sputtering target which is made of the material of the orientation adjusting layer 2. As the sputtering target, it is favorable to use the layer of at least one alloy selected from the group consisting of a Co—W-based alloy, a Co—Mo-based alloy, a Co—Ta-based alloy, a Co—Nb-based alloy, a Ni—Ta-based alloy, a Ni—Nb-based alloy, a Fe—W-based alloy, a Fe—Mo-based alloy and a Fe—Nb-based alloy. The orientation adjusting layer 2 may add an element possessing an auxiliary effect. As concrete examples of the element suitable for this addition, Ti, V, Cr, Mn, Zr, Hf, Ru, B, Al, Si and P may be cited. The total content of the added element is preferably 20 at % or less. If the total content exceeds 20 at %, the overage will result in degrading the effect of the orientation adjusting film mentioned above. The lower limit of the total content is 0.1 at %. If the total content falls short of 0.1 at %, the shortage will result in nullifying the effect of the added element.

The thickness of the orientation adjusting layer 2 is preferably in the range of 1 to 30 nm. If the thickness of the orientation adjusting film falls short of 1 nm, the shortage will result in preventing the nonmagnetic under layer 3 from acquiring satisfactory crystal orientation and degrading the coercive force. If the thickness of the orientation adjusting film exceeds 30 nm, the overage will result in inevitably degrading the magnetic anisotropy of the magnetic film in the circumferential direction. More preferably for the purpose of enhancing the magnetic anisotropy of the magnetic film in the circumferential direction, the thickness of the orientation adjusting film is in the range of 2 to 10 nm.

It is favorable to interpose between the orientation adjusting layer 2 and the nonmagnetic substrate 1 a layer having Ti and Cr, for example, as main components thereof for the purpose of enhancing the adhesiveness. Though the material for the interposed layer does not need to be particularly restricted, Ti, Cr, a Cr—Ti-based alloy, a Cr—Mo-based alloy and a Cr—Ta-based alloy are preferred examples of the material. The content of the second element in these alloy systems is preferably in the range of 10 to 75 at %.

It is commendable to incorporate in the method of production a step of exposing the first surface of the orientation adjusting layer 2 (the orientation adjusting film) to an atmosphere of oxygen. The exposure is preferably performed in an atmosphere containing $5\times10^{-4}$ Pa or more of oxygen gas. The atmospheric gas for the exposure may be used as held in contact with water. The duration of the exposure is preferably in the range of 0.5 to 15 seconds. For example, the produced orientation adjusting film is preferably exposed to the ambient atmosphere or the atmosphere of oxygen after it has been withdrawn from the chamber. Otherwise, the method which performs the exposure of the produced film by leaving the film behind in the chamber and introducing the ambient air or oxygen into the chamber proves favorable. Particularly, the method which executes the exposure in the chamber proves particularly advantageous because it obviates the necessity for a complicated step of removing the film from the vacuum chamber and consequently enables the formation of this film to be implemented within a continuous series of film formation including the formation of the nonmagnetic under layer 3 and the magnetic layer 5. In this case, the atmosphere preferably contains $5\times10^{-4}$ Pa or more of oxygen gas when the ultimate degree of vacuum is $10^{-6}$ Pa or less. As regards the upper limit of the oxygen gas pressure during the course of the exposure to the oxygen, though the exposure may be made under the atmospheric pressure, the oxygen gas pressure is preferably $5\times10^{-2}$ Pa or less.

After the orientation adjusting layer 2 has been formed, the nonmagnetic under layer 3 of a structure containing at least a Cr—Mn-based alloy layer is formed by the sputtering method. The Mn content of the Cr—Mn-based alloy is preferably in the range of 1 to 60 at % and more preferably in the range of 5 to 40 at %. The Cr—Mn-based alloy layer may add Mo, W, V and Ti, for example, for the purpose of adding to the lattice constant. Then, the addition of B and Si is effective in refining crystals and proves advantageous from the viewpoint of enhancing the SNR property of the magnetic recording medium.

The thickness of the nonmagnetic under layer 3 is preferably in the range of 0.5 to 15 nm. If the thickness of the orientation adjusting film falls short of 0.5 nm, the shortage will result in preventing the nonmagnetic under layer 3 from acquiring sufficient crystal orientation and degrading the coercive force. If the thickness of the orientation adjusting film exceeds 15 nm, the overage will result in eventually degrading the magnetic anisotropy of the magnetic film in the circumferential direction.

It is advantageous to form between the nonmagnetic under layer 3 and the nonmagnetic intermediate layer 4 at least one layer selected from the group consisting of a Cr—Mo-based alloy layer, a Cr—Ti-based alloy layer, a Cr—W-based alloy layer and a Cr—V-based alloy layer for the purpose of enhancing the condition of matching of the lattice constant between the nonmagnetic intermediate layer 4 and the magnetic layer 5. The interposed layer brings the effect of enhancing the magnetic properties, such as the coercive force, for example, and enhancing the recording properties, such as SNR, for example, because it enables the Co alloy in the nonmagnetic intermediate layer 4 and the magnetic layer 5 formed on the nonmagnetic under layer 3 to manifest crystal orientation more strongly (11.0).

After the nonmagnetic under layer 3 has been formed, the nonmagnetic intermediate layer 4 is formed similarly by the sputtering method using a sputtering target formed of the material for a nonmagnetic Co alloy layer having Co as a main component. The nonmagnetic intermediate layer 4 preferably contains any one alloy selected from the group consisting of a Co—Cr-based alloy, a Co—Cr—Ta-based alloy, a Co—Cr—Ru-based alloy, a Co—Cr—Zr-based alloy and a Co—Cr—Pt-based alloy. When the Co—Cr-based alloy is selected, the Cr content is preferably in the range of 25 to 45 at % from the viewpoint of enhancing the SNR. Further, the addition of B is effective in refining crystals and advantageous from the viewpoint of enhancing the SNR property of the magnetic recording medium. The thickness of the nonmagnetic intermediate layer 4 is preferably in the range of 0.5 to 3 nm from the viewpoint of enhancing the SNR.

It is favorable to form a nonmagnetic alloy layer using Ru either exclusively or as a main component on the nonmagnetic Co alloy layer.

After the nonmagnetic intermediate layer 4 has been formed, the magnetic layer 5 having a thickness of 5 to 40 nm is formed similarly by the sputtering method using a sputtering target made of the material of the magnetic layer 5. The sputtering target advantageously contains any one alloy selected from the group consisting of Co—Cr—Pt-based, Co—Cr—Pt—B-based, Co—Cr—Pt—B—Ta-based and Co—Cr—Pt—B—Cu-based alloys. In the case of the Co—Cr—Pt-based alloy, for example, it is advantageous to fix the Cr content in the range of 8 to 28 at % and the Pt content in the range of 8 to 18 at % from the viewpoint of enhancing the SNR. In the case of the Co—Cr—Pt—B-based alloy, for example, it is advantageous to fix the Cr content in the range of 8 to 18 at %, the Pt content in the range of 8 to 18 at % and the B content in the range of 1 to 20 at % from the viewpoint of enhancing the SNR. In the case of the Co—Cr—Pt—B—Ta-based alloy, for example, it is advantageous to fix the Cr content in the range of 8 to 25 at %, the Pt content in the range of 8 to 18 at %, the B content in the range of 1 to 20 at % and the Ta content in the range of 1 to 4 at % from the viewpoint of enhancing the SNR. In the case of the Co—Cr—Pt—B—Cu-based alloy, for example, it is advantageous to fix the Cr content in the range of 8 to 28 at %, the Pt content in the range of 8 to 18 at %, the B content in the range of 1 to 20 at % and the Cu content in the range of 1 to 8 at % from the viewpoint of enhancing the SNR.

The thickness of the magnetic layer 5 is preferably 10 nm or more from the viewpoint of thermal fluctuation. It is preferably 30 nm or less in view of the request for high recording density. If the thickness exceeds 30 nm, the overage will result in inevitably adding to the crystal particle diameter of the magnetic layer 5 and obstructing the acquisition of satisfactory recording and reproducing properties. The magnetic layer 5 may be formed in a multilayer structure. The material for this structure may be obtained by combining alloys properly selected from the group of the alloys enumerated above. When the multilayer structure is selected, the nonmagnetic under layer 3 is preferably overlaid directly by a Co—Cr—Pt—B—Ta-based alloy or a Co—Cr—Pt—B—Cu-based alloy or a Co—Cr—Pt—B-based alloy from the viewpoint of improving the SNR property in the recording and reproducing properties. The uppermost layer is preferably formed of a Co—Cr—Pt—B—Cu-based alloy or a Co—Cr—Pt—B-based alloy from the viewpoint of improving the SNR property in the recording and reproducing properties.

After the magnetic layer 5 has been formed, the protective film, such as a protective film having carbon as a main component, for example, is formed by using any of the known methods, such as the sputtering method, the plasma CVC method or the combination thereof, for example.

Further, on the protective film, the lubricating film may be optionally formed by applying a fluorine-based lubricant, such as perfluoropolyether, to the first surface of the protective film in accordance with the dip method or the spin coat method.

The magnetic recording medium of this invention is enabled, by being combined with a magnetic head for recording and reproducing information in the magnetic recording medium, to produce a magnetic recording and reproducing device of prominent performance.

EXAMPLE 1

An amorphous glass substrate made by MYG Corp. and sold under the trademark designation of MEL-3 was used as a nonmagnetic substrate. The glass substrate measured 65 mm in outside diameter, 20 mm in inside diameter and 0.635 mm in plate thickness.

This glass substrate was subjected to a mechanical texturing process. The condition of the mechanical texturing process was as follows. The slurry used contained diamond abrasive grains having a D90 of 0.12 µm. The slurry was added dropwise at a rate of 50 ml/min for 2 seconds prior to the start of the process. A woven fabric made of polyester was used as the abrasive tape. The abrasive tape was fed at a speed of 75 mm/min. The rotational frequency of the disc was 600 rpm. The disc was vibrated at a rate of 120 swings/min. The pressure exerted on the tape was 2.0 kgf (19.6 N). The processing duration was 10 sec. When the first surface of the produced glass substrate was tested with an instrument made by Digital Instrument Corp. and sold under the trademark designation of "AFM," the glass substrate was found to have an average roughness Ra of 0.3 nm and contain a texture streak having a line density of 29000 lines/mm.

This substrate was thoroughly cleaned and dried and then set in a DC magnetron sputtering device (made by Anelva Corporation, Japan, and sold under the product code of "C3010"). After the device had been evacuated till the ultimate degree of vacuum reached $2 \times 10^{-7}$ Torr ($2.7 \times 10^{-5}$ Pa), an orientation adjusting film was deposited by using a target formed of Cr at normal room temperature to a thickness of 1 nm and subsequently a Co—W alloy (Co: 45 at % and W: 55 at %) was deposited by using a target formed of the alloy at normal room temperature to a thickness of 1 nm.

Thereafter, the substrate was heated to 250° C. After this heating, it was exposed to oxygen at 0.05 Pa for 5 seconds. As a nonmagnetic under layer, a Cr—Mn alloy (Cr: 70 at %, Mn: 30 at %) was deposited by using a target made of the alloy to a thickness of 6 nm. As a nonmagnetic intermediate layer, a Co—Cr alloy (Co: 65 at %, Cr: 35 at %) was deposited by using a target made of the alloy to a thickness of 2 nm. As a magnetic layer, a magnetic Co—Cr—Pt—B alloy layer was deposited by using a target made of a Co—Cr—Pt—B alloy (Co: 60 at %, Cr: 20 at %, Pt: 13 at %, B: 7 at %) to a thickness of 17 nm. A protective film (carbon) was deposited in a thickness of 3 nm on the magnetic layer. The Ar pressure during the course of the formation of film was fixed at 3 m Torr (0.4 Pa). A lubricating layer was formed by applying a lubricant made of perfluoropolyester by the dip method to a thickness of 2 nm.

Thereafter, the glide test was performed by using a glide tester and fixing the glide height at 0.3 µin as a test condition. The magnetic recording medium which passed the test was tested for recording and reproducing properties by using a read-write analyzer (made by Guzik Corp. and sold under the trademark designation of "RWA 2550"). The recording and reproducing properties thus tested included TAA (reproduction signal output), PW50 (half power width of the isolated inversion signal), and SNR (signal/noise ratio). For the evaluation of the recording and reproducing properties, a complex thin film magnetic recording head provided in the reproducing part with a giant magnetoresistance (GMR) element was used. The noise used for the test was an integral noise recorded between 1 MHz and a frequency equivalent to 515.3 kFCl when a pattern signal of 343.5 FCl was written in the medium. The reproduction output was tested at 343.5 KFCl and calculated as SNR=20×log (reproduction output/integral noise recorded between 1 MHz and a frequency equivalent to 515.3 kFCl). For the determination of the coercive force (Hc), a Ker effect type magnetic property tester (made by Hitachi Electronic Engineering K.K. and sold under the product code of "RO1900") was used. For the measurement of the index of magnetic anisotropy, a VSM (made by Riken Denshisha K.K., Japan, and sold under the trademark designation of "BHV-35"). The test results are shown in Table 1 below.

TABLE 1

| | Nonmagnetic under layer | | | | Magnetic properties | | Recording and reproducing properties | | |
|---|---|---|---|---|---|---|---|---|---|
| | First layer | | Second layer | | | | | | |
| | Comp. at % | Thickness nm | Comp. at % | Thickness nm | Coercive force Oe | Index of anisotropy | Repro output mV | PW50 nsec | SNR dB |
| Ex. | | | | | | | | | |
| 1 | C—30Mn | 5 | None | | 4070 | 1.39 | 1.70 | 4.20 | 17.2 |
| 2 | C—5Mn | 5 | C—20Mo | 1 | 3870 | 1.32 | 1.69 | 4.22 | 17.4 |
| 3 | C—10Mn | 5 | C—20Mo | 1 | 3920 | 1.54 | 1.73 | 4.19 | 17.8 |
| 4 | C—20Mn | 5 | C—20Mo | 1 | 4050 | 1.62 | 1.77 | 4.15 | 17.9 |
| 5 | C—30Mn | 5 | C—20Mo | 1 | 4120 | 1.71 | 1.78 | 4.16 | 18.1 |
| 6 | C—40Mn | 5 | C—20Mo | 1 | 4240 | 1.68 | 1.69 | 4.16 | 18.0 |
| 7 | C—60Mn | 5 | C—20Mo | 1 | 3810 | 1.47 | 1.62 | 4.21 | 17.1 |
| 8 | C—30Mn—2B | 5 | C—20Mo | 1 | 4060 | 1.58 | 1.74 | 4.18 | 18.1 |
| 9 | C—30Mn—2Si | 5 | C—20Mo | 1 | 4030 | 1.49 | 1.71 | 4.20 | 17.8 |
| 10 | C—30Mn—2Ta | 5 | C—20Mo | 1 | 4030 | 1.53 | 1.73 | 4.19 | 17.8 |
| 11 | C—28Mn—2Mo | 5 | C—20Mo | 1 | 4120 | 1.70 | 1.79 | 4.16 | 18.0 |
| 12 | C—25Mn—5Mo | 5 | C—20Mo | 1 | 4120 | 1.55 | 1.67 | 4.15 | 18.0 |
| Comp. Ex. | | | | | | | | | |
| 1 | C—20Mo | 6 | None | | 4280 | 1.24 | 1.71 | 4.20 | 16.7 |
| 2 | Cr | 5 | C—20Mo | 1 | 3990 | 1.17 | 1.64 | 4.29 | 16.9 |
| 3 | C—80Mn | 5 | C—20Mo | 1 | 2480 | 1.06 | 1.41 | 4.40 | 15.3 |

EXAMPLES 2 TO 12

The relevant treatments were performed by following the procedure of Example 1 while changing the composition of the nonmagnetic under layer to various compositions shown in Table 1.

COMPARATIVE EXAMPLES 1 TO 3

The relevant treatments were performed by following the procedure of Example 1 while changing the composition of the nonmagnetic under layer to various compositions shown in Table 1.

The results of the tests for magnetic properties (coercive force and index of magnetic anisotropy) and recording and reproducing properties performed in Examples 1 to 12 and Comparative Examples 1 to 3 are shown in Table 1.

Example 1 covers the case of using a single Cr—Mn alloy layer as a nonmagnetic under layer. Examples 2 to 7 cover the cases of using stacked structures formed of a Cr—Mn alloy layer and a Cr—Mo alloy layer. These examples invariably showed indices of magnetic anisotropy higher than 1.3 and excelled in recording and reproducing properties.

Examples 9 to 12 cover the cases of using stacked structures formed of a Cr—Mn alloy layer which added a third element, and a Cr—Mo alloy layer. They showed indices of magnetic anisotropy in the range of 1.5 to 1.7, exhibited strong magnetic anisotropy, and excelled in recording and reproducing properties.

Comparative Examples 1 and 2 cover examples of the nonmagnetic under layer containing no Cr—Mn alloy layer. Comparative Example 1 covers the case of a single Cr—Mo alloy layer. Then, Comparative Example 2 covers the case of using a dual structure formed of a Cr layer and a Cr—Mo alloy layer. Comparative Example 3 covers the case of using a Cr—Mn alloy layer having a Mn content of 80 at %. They yielded indices of magnetic anisotropy invariably falling short of 1.3 and showed recording and reproducing properties invariably inferior to those obtained in Examples 1 to 12 cited above.

Thus, the magnetic recording medium of this invention has an orientation adjusting layer, a nonmagnetic under layer, a nonmagnetic intermediate layer, a magnetic layer and a protective layer sequentially stacked on a nonmagnetic substrate provided on the first surface thereof with a texture streak and used for a magnetic disc and is characterized by the fact that the nonmagnetic under layer contains at least a layer formed of a Cr—Mn-based alloy. Owing to this specific structure, it is enabled to manifest strong magnetic anisotropy having the circumferential direction as an axis of easy magnetization and enhance the characteristic properties of the magnetic recording medium. This invention, therefore, is capable of producing a magnetic recording medium which is suitable for high recording density.

INDUSTRIAL APPLICABILITY

According to the present invention, the magnetic recording and reproducing device which is composed of the magnetic recording medium mentioned above and a magnetic head for recording and reproducing information in the magnetic recording medium enables the recording and reproducing of a magnetic signal in the magnetic recording medium to be effected in high density with outstanding recording properties.

The invention claimed is:

1. A magnetic recording medium comprising an orientation adjusting layer, a nonmagnetic under layer, a nonmagnetic intermediate layer, a magnetic layer and a protective layer sequentially stacked on a nonmagnetic substrate provided on a first surface thereof with a texture streak and used for a magnetic disc, wherein the nonmagnetic under layer contains at least a layer formed of a Cr—Mn-based alloy, wherein the magnetic layer possesses magnetic anisotropy having an axis of easy magnetization in a circumferential direction thereof, and wherein the layer of Cr—Mn-based alloy that forms at least part of the nonmagnetic under layer has an Mn content in a range of 1 to 60 at %, wherein the nonmagnetic underlayer contains at least a layer formed of a Cr—Mn-based alloy and a layer formed of a Cr—Mo-based alloy formed thereon, and the Cr—Mn-based alloy has Cr as a first main component and Mn as a second main component, and the Cr—Mo-based alloy has Cr as a first main component and Mo as a second main component.

2. A magnetic recording medium according to claim 1, wherein the magnetic anisotropy in an amount of residual magnetization has an index of 1.3 or more that is an amount of residual magnetization in a circumferential direction divided by an amount of residual magnetization in a radial direction.

3. A magnetic recording medium according to claim 1, wherein the layer of Cr—Mn-based alloy that forms at least part of the nonmagnetic under layer has a BCC structure and an Mn content in a range of 5 to 40 at %.

4. A magnetic recording medium according to claim 1, wherein the nonmagnetic substrate is formed of amorphous glass or crystallized glass.

5. A magnetic recording medium according to claim 1, wherein the nonmagnetic substrate is formed of a single crystal Si or a polycrystal Si.

6. A magnetic recording medium according to claim 1, wherein the texture streak on the nonmagnetic substrate for the magnetic disc has a line density of 7500 lines/mm or more.

7. A magnetic recording medium according to claim 1, wherein the orientation adjusting layer is formed of at least one layer of alloy selected from the group consisting of Co—W-based alloy, Co—Mo-based alloy, Co—Ta-based alloy, Co—Nb-based alloy, Ni—Ta-based alloy, Ni—Nb-based alloy, Fe—W-based alloy, Fe—Mo-based alloy and Fe—Nb-based alloy.

8. A magnetic recording medium according to claim 1, wherein the nonmagnetic intermediate layer is formed of at least one layer of alloy selected from the group consisting of Co—Cr-based alloy, Co—Cr—Ta-based alloy, Co—Cr—Ru-based alloy, Co—Cr—Zr-based alloy and Co—Cr—Pt-Based alloy.

9. A magnetic recording medium according to claim 1, wherein the nonmagnetic intermediate layer possesses a stacked structure consisting of a layer of at least one alloy selected from the group consisting of Co—Cr-based alloy, Co—Cr—Ta-based alloy, Co—Cr—Ru-based alloy, Co—Cr—Zr-based alloy and Co—Cr—Pt-Based alloy and a layer of Ru or Ru alloy formed thereon.

10. A magnetic recording medium according to claim 1, wherein the magnetic layer contains one or more alloys selected from the group consisting of Co—Cr—Pt-based alloy, Co—Cr—Pt—Ta-based alloy, Co—Cr—Pt—B-based alloy, Co—Cr—Pt—B—Ta-based alloy and Co—Cr—Pt—B—Cu-based alloy.

11. A magnetic recording medium according to claim 1, wherein the first surface of the orientation adjusting layer has undergone a treatment for exposure to an ambient gas containing $5 \times 10^{-4}$ Pa or more of oxygen gas.

12. A magnetic recording and reproducing device comprising the magnetic recording medium according to claim 1 and a magnetic head for enabling information to be recorded in and reproduced from the magnetic recording medium.

13. A magnetic recording medium according to claim 1, wherein the Cr—Mn-based alloy contains one or more elements selected from the group consisting of Mo, W, V and Ti.

14. A magnetic recording medium according to claim 1, wherein the Cr—Mn-based alloy is formed of a Cr—Mn—Mo alloy.

15. A magnetic recording medium according to claim 1, wherein the nonmagnetic under layer contains an element B.

* * * * *